United States Patent [19]

Satterwhite et al.

[11] 4,145,309

[45] * Mar. 20, 1979

[54] DEFOAMER FOR HIGH STRENGTH ACID MEDIA

[75] Inventors: William A. Satterwhite, Englishtown; Robert M. Leach, Cranbury; Harold A. Stuhler, Browns Mills, all of N.J.

[73] Assignee: Cities Service Company, Tulsa, Okla.

[*] Notice: The portion of the term of this patent subsequent to Dec. 27, 1994, has been disclaimed.

[21] Appl. No.: 828,583

[22] Filed: Aug. 29, 1977

Related U.S. Application Data

[63] Continuation of Ser. No. 665,753, Mar. 11, 1976, abandoned.

[51] Int. Cl.² .......................................... B01D 17/04
[52] U.S. Cl. ................................. 252/358; 252/321
[58] Field of Search ................. 252/321, 358; 423/320

[56] References Cited

U.S. PATENT DOCUMENTS

| 1,941,886 | 1/1934 | Fischer et al. | 252/358 |
| 3,671,235 | 6/1972 | Yamaguchi et al. | 252/358 |
| 4,065,404 | 12/1977 | Satterwhite et al. | 252/358 |

FOREIGN PATENT DOCUMENTS

| 531776 | 10/1956 | Canada | 252/321 |
| 533816 | 11/1956 | Canada | 252/321 |
| 544314 | 7/1957 | Canada | 252/321 |

*Primary Examiner*—Benjamin R. Padgett
*Assistant Examiner*—Deborah L. Kyle
*Attorney, Agent, or Firm*—Donald L. Traut

[57] ABSTRACT

A defoamer for controlling the foam in high strength acid media and process for preparing same having a majority of a sulfonated oil and a minority of a long chain alcohol and a nonionic additive.

21 Claims, No Drawings

DEFOAMER FOR HIGH STRENGTH ACID MEDIA

This is a continuation, of application Ser. No. 665,753 now abandoned, filed Mar. 11, 1976.

BACKGROUND OF THE INVENTION

1. Field of the Invention

The invention is related to a surface active material, a defoamer. More particularly, this invention provides a defoamer and process for preparing same which controls the foam in high strength acid media from petroleum products.

2. Description of the Prior Art

Conventional defoamers contain sulfonated tall oil-fatty acids. Some are produced from a refined oleic acid while others are produced from tall oil. The primary application of these defoamers is in the phosphate industry to control the foam in the digestion and concentration stages of wet-process phosphoric acid manufacture. In recent years cost of conventional defoamers has drastically increased because of the high cost of raw materials utilized in their manufacture. Therefore, what is needed and what has been invented by us is a novel defoamer which is not only low in cost but is also more effective than the conventional defoamers being marketed.

SUMMARY OF THE INVENTION

It is therefore an object of this invention to provide a defoamer and a process for preparing same.

It is yet another object of this invention to provide a defoamer which is economical to prepare and is more effective than conventional defoamers.

These and other objects will become apparent to those skilled in the art as the following description proceeds.

The foregoing objects are achieved in accordance with this invention. Broadly, this invention is a defoamer and process for preparing same for controlling the foam in high strength acid media using petroleum products which comprises a majority of a sulfonated oil and a minority of a long chain alcohol and a nonionic additive having the formula R-O(R'O)$_n$R" wherein R' is a hydrocarbyl, R and R" are hydrocarbyl or hydroxyhydrocarbyl, and n is from 1 to about 200.

DETAILED DESCRIPTION OF THE INVENTION

The composition of matter of this invention is a defoamer for controlling the foam in high strength acid media which broadly comprises a majority of a sulfonated oil and a minority of a long chain alcohol and a nonionic additive. The oil may be any petroleum feedstock, mineral oil, fuel oils and/or lubricants derived from petroleum and its products including hydrocarbons. A preferred oil is one having a viscosity at 100° F. of between about 5 N SUS and 1000 N SUS. The oil is sulfonated by mixing it with a mixture of SO$_3$ and SO$_2$ at a temperature of between about 20° F. and 212° F. A preferred temperature is room temperature (i.e. about 72° F.). The SO$_3$ is too reactive alone; therefore, SO$_2$ is utilized to pacify the reaction. The SO$_2$ does not enter into the reaction of the SO$_3$ and oil but merely acts as a diluent and coolant for the strong oxidizing tendencies of the SO$_3$. The alcohol is used to disperse and/or dissolve the acid sludge. The alcohol not only disperses the sludge but also permits the formation of a synergistic product to produce a defoamer which is several fold more effective than the sulfonate or the alcohol alone. The alcohol may be any alcohol that is soluble in the sulfonated oil. Preferably the alcohol may be any straight or branched long chain alcohol having between about 4 and 20 carbon atoms. More preferably the alcohol has between about 8 and 14 carbon atoms. Most preferably the alcohol is dodecyl alcohol.

The nonionic additive preferably has the formula R-O (R'-O)$_n$R" wherein R' is a hydrocarbyl, R and R" is either a hydrocarbyl or hydroxyhydrocarbyl, and n is an integer of from 1 to about 200. More preferably the nonionic additive is polyoxyalkene alkyl ether or hydrocarbyloxy poly (alkyleneoxy) alcohol, wherein the polyoxyalkene group has from about 2 to about 10 carbon atoms, the alkyl radical includes from about 1 to about 18 carbon atoms, the hydrocarbyloxy group contains from about 1 to about 50 carbon atoms and is preferably selected from the group consisting of anthryloxy naphthyloxy and phenoxy, the alkyleneoxy group has from about 2 to about 10 carbon atoms, and the alcohol comprises from about 1 to about 10 carbon atoms. Most preferably the nonionic additive is selected from the group consisting of tridecyloxypoly (ethyleneoxy) ethanol and octylphenoxypoly (ethyleneoxy) ethanol. The nonionic additive preferably comprises from about 0.10 wt% to about 50 wt% of the defoamer; more preferably the defoamer has from about 1 to about 8 wt% of the additive; more preferably the defoamer comprises about 4 wt% of the additive.

The sulfonation ratio of SO$_3$ to oil may broadly be from about 0.025:1 to about 0.60:1. The more preferred sulfonation ratio of SO$_3$ to oil is from between about 0.1:1 to about 0.3:1, most preferably, the ratio is about 0.25:1.

The ratio of alcohol to the sulfonated oil may broadly be from about 0.025:1 to about 0.75:1. The more preferred ratio of alcohol to sulfonated oil is from between about 0.25:1 to about 0.50:1; most preferably, the ratio is about 0.38:1.

In the process for preparing the defoamer the oil is sulfonated with a minority of SO$_3$ dissolved in a majority of SO$_2$. The mixing ratio of SO$_3$ to SO$_2$ may be any suitable ratio such that SO$_2$ quiesces the reactive SO$_3$. Preferably SO$_3$ and SO$_2$ are mixed in a ratio of from approximately 1:1 to about 1:15. During the course of the reaction of the oil and the SO$_3$, SO$_2$ mixture, the temperature decreases. The mixture is preferably allowed to react from between about 15 minutes and 90 minutes whereafter the reacted product is a mixture of sulfonated oil and an acid sludge. The alcohol is subsequently added to the sulfonated oil to disperse the sludge. After the admixing of the alcohol to the sulfonated oil, the mixture is blended from between about 15 mins. and 90 minutes. Subsequently the nonionic additive is mixed with the sulfonated oil and alcohol mixture and blended for at least 15 minutes to insure a homogenious mixture. It should be noted that the 90 minute upper limitation on the reaction time of the oil and SO$_3$, SO$_2$ mixture, and the sulfonated oil and alcohol mixture is not to be construed as an unduly limitation. Longer reaction times would be superfluous because the reactions are completed after about 15 minutes.

In the following is set forth examples of our invention which are given by way of illustrations and not by limitations. The specific concentrations, temperatures, times, compounds, etc., set forth in these examples are not to be construed to unduly limit the scope of the invention.

EXAMPLE 1

Four hundred grams of a neutral lube oil having a viscosity of 350 N SUS at 100° F. were sulfonated at room temperature with 100 gms of liquid $SO_3$ dissolved in 500 gms of liquid $SO_2$. During the course of the reaction, the temperature decreased to $-10°$ F. The mixture was allowed to react for ½ hour at which time the temperature rose to 70° F. The product was then heated to 140° F. to strip residual $SO_2$. The reacted product was a mixture of sulfonated oil and sludge. Dodecyl alcohol was added to the mixture to disperse the sludge. The alcohol was added in a ratio of 300 grams of alcohol to 500 grams of sulfonated oil. The mixture was blended for 30 minutes at 140° F. to insure complete dispersion of the sludge. 32 grams of tridecyloxypoly (ethyleneoxy) ethanol were then added and blended for at least 15 minutes.

This defoamer was added periodically to a reactor having a continuous flow of phosphate rock, 60% $H_2SO_4$, and recycled phosphoric acid (25% $P_2O_5$) in order to control the foaming. This defoamer was proved to be superior to conventional defoamers on a cost/ton of $P_2O_5$ basis and defoamer requirements/ton of $P_2O_5$ as evidenced in the following Table I:

Table I

|  | Defoamer Requirements per ton $P_2O_5$ (lbs./ton) | Treatment Cost per ton $P_2O_5$ ($) |
|---|---|---|
| Applicants' Defoamer | 1.16 | .26 |
| Conventional Defoamers including tall oil, fatty acids, by-products of paper industry: |  |  |
| Brand A | 4.00 | 0.70 |
| Brand B | 2.87 | 0.65 |
| Brand C | 4.68 | 1.24 |
| Brand D | 6.62 | 1.16 |
| Brand E | 4.18 | 6.94 |
| Brand F | 9.60 | 1.63 |
| Brand G | 4.66 | 0.98 |

EXAMPLE 2

Four hundred grams of a neutral lube oil having a viscosity of 350 N SUS at 100° F. were sulfonated at room temperature with 130 grams of liquid $SO_3$ dissolved in 650 grams of liquid $SO_2$. During the course of the reaction, the temperature decreased to $-10°$ F. The mixture was allowed to react for 1 hour at which time the temperature rose to 85° F. The product was then heated to 120° F. to strip residual $SO_2$. The reacted product was a mixture of sulfonated oil and acid sludge. Dodecyl alcohol was added to the mixture to disperse the sludge. The alcohol was added in a ratio of 318 grams alcohol to 400 grams of sulfonate. The mixture was agitated for 30 minutes to insure complete dispersion of the sludge. 34 grams of octylphenoxypoly (ethyleneoxy) ethanol was subsequently added and blended for at least 15 minutes. Subsequently the defoamer was tested and compared to conventional defoamers in accordance with Example I and similar results were found.

EXAMPLE 3

Four hundred grams of a neutral lubricating oil having a viscosity of 350 N SUS at 100° F. were sulfonated at room temperature with 80 grams of liquid $SO_3$ dissolved in 400 grams of liquid $SO_2$. During the course of the reaction, the temperature dropped to $-10°$ F. The mixture was allowed to react for 45 minutes at which time the temperature of the mixture rose to 60° F. The reacted product was a mixture of sulfonated oil and acid sludge. Dodecyl alcohol was added to the mixture to disperse the sludge. The alcohol was added in a ratio of 288 grams of alcohol to 480 grams of the sulfonate. The mixture was stirred at room temperature for 30 minutes to insure complete dispersion of the sludge. 31 grams of tridecyloxy-poly (ethyleneoxy) ethanol were added thereafter and agitated for at least 15 minutes. Subsequently the defoamer was tested and compared to conventional defoamers in accordance with EXAMPLE I and similar results were found.

EXAMPLE 4

Repeat Examples 1–3, but vary the mixing ratios of $SO_3$ to oil in 0.005 increments between 0.025 and 0.400 and find similar results.

EXAMPLE 5

Repeat Examples 1–4 but vary the type of alcohol (both straight chain and branched) linear or cyclic in 1 carbon atom increments between 4 carbon atoms and 20 carbon atoms and find similar results.

EXAMPLE 6

Repeat Examples 1–5 but vary the sulfonation temperature in increments of 5° F. between $-20°$ F. and 212° F. and find similar results.

EXAMPLE 7

Repeat Examples 1–6 but vary the mixing ratio of the alcohol to the sulfonated oil in increments of 0.005 between 0.025 and 0.750 and find similar results.

EXAMPLE 8

Repeat Examples 1–7 but vary the mixing ratio of the $SO_3$ to $SO_2$ in increments of 1:1 between 1:1 to 1:15 and find similar results.

EXAMPLE 9

Repeat Examples 1–8 but lower the reaction time of $SO_3$ and $SO_2$, and the agitation time of sulfonated oil and alcohol to 15 minutes and find similar results.

EXAMPLE 10

Repeat Examples 1–9 but vary the procedure in accordance with the following: vary the amount of the additive in increments of 0.5 wt% between about 0.10 wt% to about 50 wt% of the defoamer; vary the type of surfactant utilizing the formula $R-O(R'-O)_nR''$ where $R'$ is a hydrocarbyl, R and R" is hydrocarbyl or hydroxyhydrocarbyl, n is from 1 to about 200: vary n in increments of 1, vary the hydrocarbyl, the hydrocarbyl, the hydroxyhydrocarbyl in 1 carbon atom increments between 1 carton atom to about 50 carbon atoms; use nonylphenoxypoly (ethyleneoxy) ethanol or oleyl ethoxy ethanol as the additive, all belonging to the family of compounds called alkoxypoly (ethyleneoxy) ethanols or generally derivatives of ether, ethylene oxide. Find similar results.

EXAMPLE 11

Take the sulfonated oil of EXAMPLE 1, the alcohol of EXAMPLE 1, and the additive of EXAMPLE 1 and test the defoamer requirements of each and synergistically compare. Find the following synergistic results:

Table 2

|  | Defoamer Requirements per ton $P_2O_5$ | Cost per ton $P_2O_5$ |
| --- | --- | --- |
| Sulfonated oil | 7.52 | 1.88 |
| Alcohol | 6.03 | 1.20 |
| Sulfonated oil- alcohol mixture | 2.59 | .58 |
| Applicants' Defoamer | 1.16 | .26 |

EXAMPLE 12

Repeat EXAMPLE 11 in accordance with each procedure of EXAMPLES 2-10 and find the similar results given in EXAMPLE 11.

While the present invention has been described herein with reference to particular embodiments thereof, and specific examples, a latitude of modifications, various changes and substitutions are intended in the foregoing disclosure, and in some instances some features of the invention will be employed without a corresponding use of other features without departing from the scope of the invention as set forth.

We claim:

1. A defoamer for controlling the foam in high strength acid media comprising:
   (i) from about 48.8 wt% to about 97.5 wt% of a sulfonated petroleum oil;
   (ii) from about 1.2 wt% to about 42.8 wt% of an alcohol having from about 4 to about 20 carbon atoms; and
   (iii) from about 0.1 wt% to about 50 wt% of nonionic additive having a formula $R\text{-}O(R'\text{-}O)_nR''$ wherein $R'$ is hydrocarbyl, R and $R''$ are hydrocarbyl or hydroxyhydrocarbyl, and n is an integer of from 1 to about 200.

2. The defoamer of claim 1 wherein said nonionic additive is polyoxyalkene alkyl ether wherein the polyoxy alkene group comprises from about 2 to about 10 carbon atoms and the alkyl radical includes from about 1 to about 18 carbon atoms.

3. The defoamer of claim 2 wherein said polyoxyalkene alkyl ether is oleyl ethoxy ethanol.

4. The defoamer of claim 1 wherein said nonionic additive is hydrocarbyloxy poly alkyleneoxy alcohol wherein the hydrocarbyloxy group has from about 1 to about 50 carbon atoms, the alkeneoxy group has from about 2 to about 10 carbon atoms, and the alcohol has from about 1 to about 10 carbon atoms.

5. The defoamer of claim 4 wherein said additive is selected from the group consisting of tridecyloxy-poly (ethyleneoxy) ethanol and octylphenoxypoly (ethyleneoxy) ethanol.

6. The defoamer of claim 4 wherein the hydrocarbyloxy group is selected from the group consisting of anthryloxy, naphthyloxy, and phenoxy.

7. The defoamer of claim 1 wherein said nonionic additive comprises from about 1 wt% to about 8 wt% of said defoamer.

8. The defoamer of claim 1 wherein said long chain alcohol comprises a linear alcohol of from about 8 carbon atoms to about 14 carbon atoms.

9. The defoamer of claim 1 wherein said long chain alcohol comprises a branched chain alcohol of from about 8 carbon atoms to about 14 carbon atoms.

10. The defoamer of claim 1 wherein said ratio of said alcohol to said sulfonated petroleum oil is from about 0.25:1 to about 0.50:1.

11. A process for preparing a defoamer for controlling the foam in high strength acid media comprising mixing:
   (i) from about 48.8 wt% to about 97.5 wt% of a sulfonated petroleum oil;
   (ii) from about 1.2 wt% to about 42.8 wt% of an alcohol having from about 4 to about 20 carbon atoms; and
   (iii) from about 0.1 wt% to about 50 wt% of nonionic additive having a formula $R\text{-}O(R'\text{-}O)_nR''$ wherein $R'$ is hydrocarbyl, and n is an integer of from 1 to about 200.

12. The process of claim 11 wherein said nonionic additive is polyoxyalkene alkyl ether wherein the polyoxyalkene group comprises from about 2 to about 10 carbon atoms and the alkyl radical includes from about 1 to about 18 carbon atoms.

13. The process of claim 12 wherein said polyoxyalkene alkyl ether is polyoxyethylene (2) oleyl ether.

14. The process of claim 11 wherein said nonionic additive is hydrocarbyloxy poly (alkeneoxy) alcohol wherein the hydrocarbyloxy group has from about 1 to about 50 carbon atoms, the alkyleneoxy group has from about 2 to about 10 carbon atoms, and the alcohol has from about 1 to about 10 carbon atoms.

15. The process of claim 14 wherein said additive is selected from the group consisting of tridecyloxypoly (ethyleneoxy) ethanol and octylphenoxypoly (ethyleneoxy) ethanol.

16. The process of claim 14 wherein the hydrocarbyloxy group is selected from the group consisting of anthryloxy, naphthyloxy, and phenoxy.

17. The process of claim 11 wherein said nonionic additive comprises from about 1 wt% to about 8 wt% of said defoamer.

18. The process of claim 11 wherein said long chain alcohol comprises a linear alcohol of from about 8 carbon atoms to about 14 carbon atoms.

19. The process of claim 11 wherein said long chain alcohol comprises a branched chain alcohol of from about 8 carbon atoms to about 14 carbon atoms.

20. The process of claim 11 wherein the ratio of said alcohol to said sulfonated oil is from about 0.25:1 to about 0.50:1.

21. The process of claim 11 additionally comprising agitating said mixture of sulfonated petroleum oil and alcohol for at least 15 minutes immediately after adding said alcohol to insure complete dispersion of acid sludge resulting from sulfonation of the petroleum oil.

* * * * *